United States Patent

Grimshaw

[15] 3,662,890
[45] May 16, 1972

[54] WASTE TREATMENT SYSTEM
[72] Inventor: Derald E. Grimshaw, Denver, Colo.
[73] Assignee: Environmental Services, Inc., Little Ferry, N.J.
[22] Filed: Oct. 19, 1970
[21] Appl. No.: 81,838

[52] U.S. Cl. ............................210/195, 210/3, 210/15, 210/205, 210/220
[51] Int. Cl. ............................................C02c 1/08
[58] Field of Search ......................210/3–9, 14, 15, 210/194–197, 220, 221, 205

[56] References Cited

UNITED STATES PATENTS

| | | | |
|---|---|---|---|
| 3,477,947 | 11/1969 | Kappe | 210/194 X |
| 3,530,990 | 9/1970 | Grimshaw | 210/220 X |
| 3,531,406 | 9/1970 | Smith et al. | 210/62 |

*Primary Examiner*—Michael Rogers
*Attorney*—C. Hercus Just

[57] ABSTRACT

A system and method of treating contaminated liquid, such as domestic waste liquid in a septic tank, by progressively withdrawing part of the liquid into a closed chamber and aerating it under pressure to permeate it extensively with clean ambient air, and discharging the saturated liquid into the septic tank, or other type of tank if different waste liquid from domestic waste is being treated, to enhance the reduction of B.O.D. and/or C.O.D. of said liquid prior to discharge from the tank.

6 Claims, 10 Drawing Figures

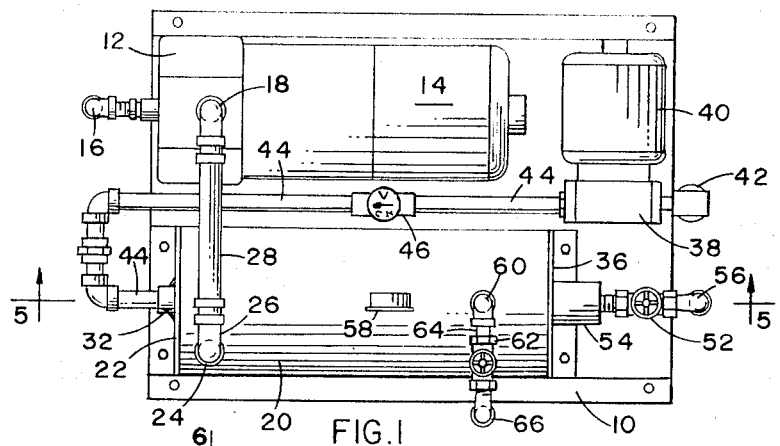
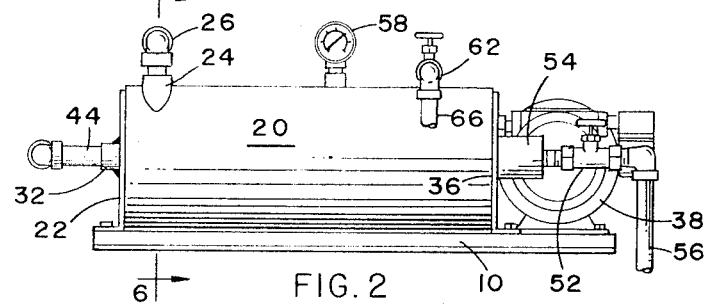
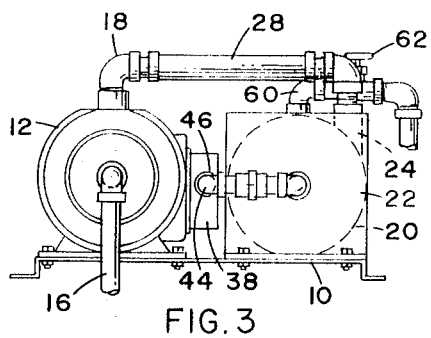
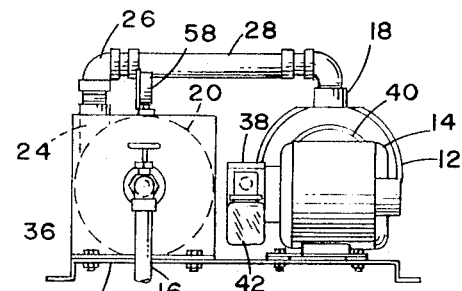
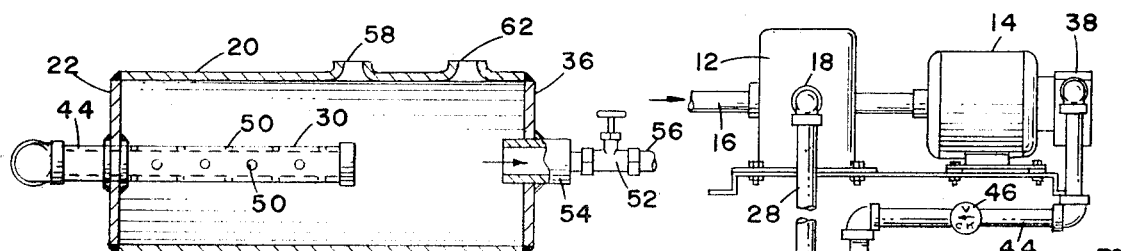
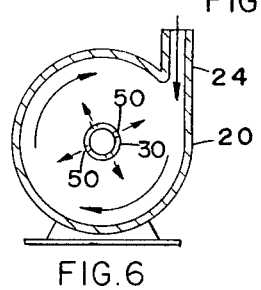
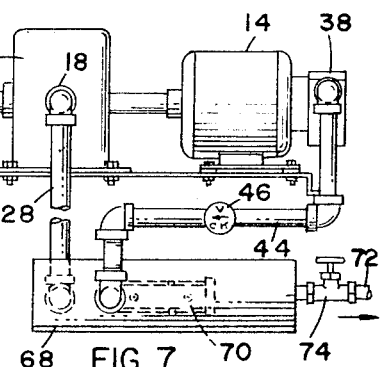
INVENTOR.
DERALD E. GRIMSHAW
BY
ATTORNEY

INVENTOR.
DERALD E. GRIMSHAW
BY
ATTORNEY

WASTE TREATMENT SYSTEM

CROSS-REFERENCE TO RELATED APPLICATION

This application is somewhat related to applicant's prior application, Ser. No. 878,378, filed Nov. 20, 1969, now U.S. Pat. No. 3,555,783, and Ser. No. 822,912, filed May 8, 1969, now U.S. Pat. No. 3,530,990, but the invention comprising the subject matter of the instant application includes different details and has different objectives from the inventions of said preceding applications.

BACKGROUND OF THE INVENTION

The present invention is particularly effective to treat domestic waste, either from a single residence, or a group of residential units, whether individual rooms such as in a motel, or a group of houses. Depending upon the number of living units to be serviced by the treatment system comprising the invention, it is contemplated that expansion of the size and capacity of the system readily can be effected to accommodate an appreciable number of living units. In addition, certain types of commercial and industrial waste can be treated by a system embodying the principles of the present invention, whereby the description of the invention set forth herein, which is of a type especially adapted for treatment of domestic waste, is not to be restricted solely to such treatment of domestic waste.

For long periods of time, domestic waste as well as certain types of commercial and industrial wastes have either been discharged in raw condition into public bodies of water or, especially in regard to domestic wastes produced in rural areas, the same has been treated at least to a certain extent in septic tanks, cesspools and other rather inefficient and primitive types of treating systems. One of the principal deficiencies of the systems used at present for the treatment of domestic wastes, such as septic tanks and cesspools, is the deficiency of the systems and units to satisfactorily aerate the waste liquid in order to reduce the B.O.D. and C.O.D. thereof to a satisfactory level at which it can be discharged with reasonable safety and minimum harmful effects into public bodies of water.

The inadequacy of existing septic tanks and cesspool systems to aerate waste liquid renders the aerobic treatment of the waste inadequate to promote the growth and nourishment of an adequate quantity of microorganisms which, under ideal conditions, are capable of converting the waste material into harmless substances and relatively pure water.

SUMMARY OF THE INVENTION

It is the principal object of the present invention to provide both a system and a method for treating waste liquids such as domestic waste liquid, to reduce the B.O.D. thereof by means of pumping the liquid from a body thereof into a closed chamber and while injecting air thereinto under pressure to substantially permeate or actually saturate the liquid with said air by increase of the pressure thereof, followed by discharging the aerated liquid back into the body of liquid from which it was pumped and thereby accelerate the reduction of the B.O.D. thereof.

It is another object of the invention to provide means to control the discharge of aerated liquid from said closed chamber for pressure adjustment to assure production of an oxygen-saturated liquid.

It is a further object of the invention to introduce air under pressure into said closed chamber by means of a sparger extending longitudinally into the chamber from one end thereof, said chamber preferably being an elongated cylinder.

Still another object of the invention is to provide means to introduce liquid to be treated in said closed chamber in a direction tangential to the axis of said cylinder and thereby provide turbulence within said chamber to enhance intermixing the air with said liquid.

One further object of the invention is to employ relatively simple components of the off-the-shelf type for ease of initial fabrication, as well as replacement purposes, except the aerating and mixing tank.

A still further object of the invention is to provide additional treatment tank means communicating with the discharge end of the principal tank and provide means to discharge additional air into said additional treatment tank to further enhance the aeration of the treated liquid and thereby further reduce the B.O.D. and C.O.D. thereof, even though the main part of such reduction may have been accomplished in the principal tank.

Details of the invention and the foregoing objects, as well as other objects thereof, are set forth in the following specification and illustrated in the accompanying drawings comprising a part thereof.

DESCRIPTION OF THE DRAWINGS

FIG. 1 is a top plan view of an exemplary mixing unit for mixing air under pressure with liquid to be aerated thereby in accordance with the principles of the invention.

FIG. 2 is a side elevation of the mixing unit shown in FIG. 1.

FIG. 3 is an end view of the left-hand end of the mixing unit shown in FIGS. 1 and 2.

FIG. 4 is an end view of the right-hand end of the mixing unit shown in FIGS. 1 and 2.

FIG. 5 is a sectional view of part of the mixing unit shown in FIG. 1 as seen on the line 5—5 of said figure.

FIG. 6 is a transverse sectional view as seen on the line 6—6 of FIG. 2.

FIG. 7 is a top plan view of a different embodiment of mixing unit from that shown in the preceding figures.

DESCRIPTION OF THE PREFERRED EMBODIMENTS

Figure 8:
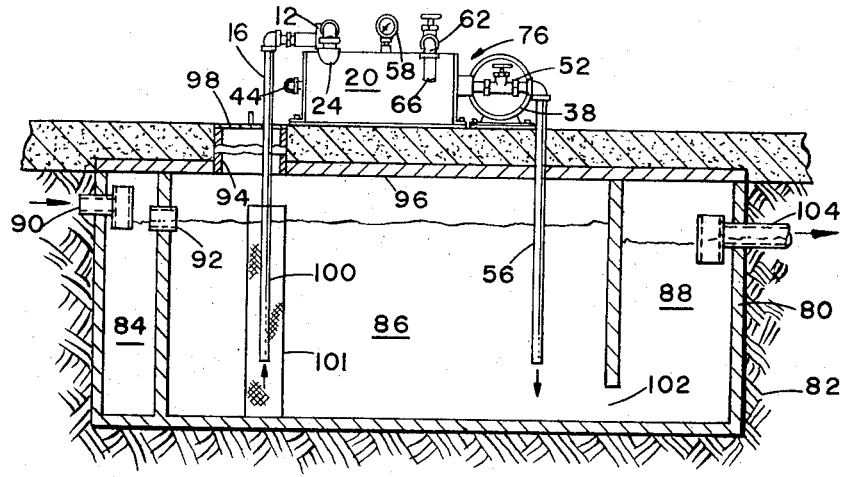
FIG. 8 is a side elevation, principally in vertical section of a system for treating waste liquid utilizing the mixing unit shown in FIGS. 1 through 6 in association with a septic tank.

As indicated above, the system and method comprising the present invention for purposes of treating waste liquid primarily is effective for the treatment of domestic wastes. However, at least certain forms of commercial and industrial wastes may be treated by such system and method, particularly where the wastes are of a substantially biological nature. For purposes of simplifying the illustration and description of the preferred forms of the invention however, a basic treating and mixing unit has been selected which is of a relatively simple but highly efficient nature. Said unit preferably is mounted above ground, such as above a septic tank or cesspool. The latter items are considered to be treatment tanks as set forth in detail hereinafter in the following description.

BASIC TREATMENT SYSTEM

Referring particularly to FIGS. 1 – 6 of the drawings, wherein the essential elements of the basic treatment system are illustrated, there is shown a base 10 which, for example, is illustrated as a metal plate but, if desired, the elements of the system may be a concrete slab of suitable area and thickness, or the plate 10 may be mounted upon such a slab. Supported adjacent one side of the base 10 is a pump 12 of standard self-priming type and suitable capacity. If desired, the pump may be of the centrifugal self-priming or foot-valve controlled type which is driven by an appropriate electric motor 14, for example. The pump has an inlet 16 and an outlet 18 to which appropriate elbows are connected to accommodate conventional tubing or piping.

Extending along one side of the combination pump 12 and motor 14, is a closed cylindrical treating and mixing chamber 20. In general, such chamber is primarily the only element or item of the basic treatment system which is not of a standard, off-the-shelf type or nature of manufactured equipment. Therefore, it is essential to fabricate the chamber 20 in a custom manner to embody the principles of the invention. The chamber 20 preferably is cylindrical, at least at the inlet end 22 thereof. Mounted adjacent the inlet end 22 of chamber 20 is a tangential coupling 24. This constitutes the inlet for water to be treated in the chamber 20. The upper end thereof is connected by an elbow 26 to a horizontal conduit 28 which communicates with the outlet 18 of pump 12.

Water or similar liquid which is to be treated within the chamber 20 is delivered in spiraling or swirling manner due to the tangential arrangement of coupling 24 on chamber 20 adjacent the inlet end thereof. This is a highly efficient, yet very simple, means for effecting a high degree of mixing of the liquid with ambient atmospheric air which also is introduced into chamber 20 by the following means.

Referring particularly to FIG. 5, which is a longitudinal sectional view of chamber 20, it will be seen that the inlet end 22 thereof is provided with a central bore through which one end of a perforated tubular sparger 30 extends. The end of the sparger 30 which extends through the inlet end 22 of chamber 20 preferably is welded to said end 22 and the opposite end is capped to close it. A threaded end of sprager 30 also projects outwardly from inlet end 22 of chamber 20 for purposes of having an elbow 34 connected thereto. The opposite end of chamber 20 has an outlet end 36 connected thereto and it is preferred that the inlet end 22 and outlet end 36 of the chamber 20 be connected fixedly, such as by welding, to the opposite ends of the preferably tubular chamber 20. Accordingly, before such weldments occur, the sparger 30 must be welded relative to the inlet end 22 of the chamber 20, as indicated above. Mechanism connected with the sparger 30 is as follows.

Referring particularly to FIGS. 1 and 2, it will be seen that an air compressor 38 is connected to the driving end of an electric motor 40 which also is secured to base 10. The inlet end of compressor 38 has an air filter 42 connected thereto. The discharge end of the compressor has a delivery conduit 44 connected thereto. A check valve 46 is connected between the ends of the delivery conduit 44 and the opposite end of said conduit is connected to an inlet end 48 of sparger 30. It thus will be seen that filtered air, which is compressed to a desired extent above atmospheric by compressor 38, is delivered to the inlet end of sparger 30 for discharge through the multiplicity of perforations 50 therein, which preferably are evenly spaced therealong and therearound, into the liquid being treated within the chamber 20.

In FIG. 6, wherein certain directional arrows are illustrated, it will be seen that the tangential inlet of liquid through the coupling 24, causes spiraling and swirling of the liquid about the axis of chamber 20. The liquid is engaged by the radially discharging jets of air from the ports or perforations 50 in sparger 30, thereby producing highly effective mixing of the air and liquid, as well as disintegration of solid particles of materials in the liquid and causing thorough permeation of the liquid by said air. Depending upon the volume and rate of the discharge of air into the liquid, the liquid actually can be completely saturated with said air and also is always under pressure to further facilitate the saturation thereof. There is no air at the top of the liquid within the chamber 20 due to said chamber always being maintained completely filled with liquid.

The control of the liquid pressure condition within the chamber 20 primarily is effected by means of a suitable valve, such as a gate valve 52 at the discharge end of chamber 20 which preferably is set for the required pressure. The outlet end of valve 52 communicates with a discharge conduit 56 for purposes to be described.

Chamber 20 also is provided with an appropriate pressure gauge 58. An experienced operator normally needs only the gauge 58 to determine setting of the operating conditions of the basic system described above. One of the advantages and favorable characteristics of said system is the fact that highly effective treatment of contaminated water and especially reduction of the B.O.D. thereof can be achieved at relatively low pressure. For example, in regard to a system which has been under tests for a number of previous months, the pressure utilized was 5 psi. Also, for purposes of withdrawing testing samples of the liquid being treated, the chamber 20 is provided with a discharge elbow 60 having a suitable manually operable valve 62 connected in a conduit 64 extending from the nipple and discharging into a suitable conduit such as a flexible hose 66 which is operable to discharge liquid into a suitable receptacle for test purposes.

Under circumstances where either a more simple system is desired or a more intimate intermixing of air and contaminated liquid is to be treated, attention is directed to the arrangement shown in FIG. 7 in which the pump is driven by a motor 14 as in the preceding embodiment but, for further simplification, the motor 14 may be of agreater horsepower than employed in the preceding embodiment in order to directly drive the compressor 38 instead of requiring a separate motor to drive the same. The pump outlet 18 discharges through conduit 28 into a treating and mixing chamber 68, such as at one end thereof. The discharge conduit 44 and check valve 46 direct air into a sparger 70 which preferably is coaxial with and mounted internally of the chamber 68 by any suitable means, not shown. The chamber 68 discharges at the opposite ends through a conduit 72 and such discharge rate is controlled by a suitable gate valve 74 or the like.

ENTIRE TREATMENT SYSTEM

The basic treatment system illustrated in FIGS. 1 – 6, for example, preferably is used in association with treatment tanks, which preferably are disposed within the ground adjacent a residence or group of residential units. Such basic treatment system may be used with a septic tank but it operates more efficiently if employed with treatment tanks of the type shown for example in FIGS. 8 – 10. To illustrate the manner in which applicant's basic treatment system is associated with such treatment tanks, attention is directed to said figures wherein three different exemplary embodiments of treatment tanks are illustrated in combination with one or more of applicant's basic treatment system.

Referring to FIG. 8, the basic treatment system 76 is of the type illustrated for example in FIGS. 1 – 6. The base 10 thereof is illustrated as being mounted above the ground level 78. A practical type of treatment tank 80 is shown in FIG. 8 mounted within the ground 82 and is provided with an inlet compartment 84, treating compartment 86, and exit compartment 88, wherein the limited amount of suspended solids may settle. Said compartment is sometimes known as the polishing compartment. For example, the tank 80 and the various partitions which define the aforementioned compartments may be formed from suitable material such as metal or concrete. Compartment 84 has an inlet head 90 into which raw liquid to be treated enters compartment 84. A transfer port 92 of conventional design is provided in the partition defining one side of treatment compartment 86 and through which the liquid to be treated enters treating compartment 86.

An appropriate manhole liner 94 extends from a suitable manhole in the top 96 of the treatment tank to the ground level, where it is covered by an appropriate cover 98. The inlet 16 of pump 12 has an uptake conduit 100 connected therewith and the discharge conduit 56 from control valve 52 extends into compartment 86. Under normal circumstances, the basic treatment unit or system 76 operates substantially continuously, although periodic operation, controlled automatically by a suitable timer switch or the like, may be employed if desired. For reasons set forth hereinafter, however, even when operating continuously, only relatively inexpensive power consumption is necessary.

When the system 76 is operating, for example, on a continuous basis, liquid to be treated is constantly drawn upwardly through uptake conduit 100, which is surrounded through a suitable screen 101, and passes through all the components of the system 76 such as shown in detail in FIGS. 1 – 6. The highly aerated liquid discharged from the system through conduit 56 is returned to compartment 86 where said highly aerated liquid rapidly mixes with the residual liquid in the compartment and very extensive reduction of the B.O.D. and C.O.D. occurs. Depending upon the rate of withdrawal and return of the liquid to compartment 86, or the cycling periods employed if the system is not operated on a continuous basis, it is preferred that the system 76 be so sized that complete passage of the entire volume of liquid in compartment 86 through the system 76 will occur once each hour.

The treated liquid gradually flows from its level in compartment 86 through the port 102 into exit compartment 88 where it is at a lower level and will linger for a short period while the oxygen dissolved in the liquid continues to function and reduce the B.O.D. and C.O.D. following which the treated liquid exits through discharge head 104 into a suitable passage to a public stream or otherwise.

For purposes of affording a reasonably complete concept of the manner in which the basic treatment system, as well as the entire treatment system described hereinabove, operates and the sizes and capacities of certain trial examples thereof which have operated successfully, the following statistics are provided.

The unitary system of the type shown in FIG. 8, employing a basic treatment system 76 of the type shown in FIGS. 1 - 6 was used relative to a treatment tank which had been malfunctioning for a substantial period of time and was highly odoriferous and colored as well as having many visible solids therein. Notwithstanding the fact that the tank was under continuous use at the time the aforementioned equipment was installed, wherein a relatively short period of one week, the tank was cleared of scum and turbidity and the B.O.D. level was reduced to 10 ppm. The unit employed had a ⅓ h.p. motor 14 to drive pump 12; the compressor 38 had a 1/12h.p. motor operating at 1,725 rpm and the pressure generated within the treating and mixing chamber 20 was approximately 5 psi. The rate of "turnover" of the liquid within the compartment 86 was within approximately 1 hour's time. When the test was initiated, the B.O.D. of the contents of the subject tank was approximately 400 ppm.

It is obvious from the foregoing exemplary statistics that a highly effective waste liquid treatment system has been provided which is capable of operating at relatively low cost of consumed power to provide effluent ranging from approximately 10 to 30 ppm B.O.D. It is to be understood however that the foregoing example is given by way of illustration and the invention is not to be restricted to the exemplary sizes and capacities set forth. Under all conditions of use, the equipment to be employed with a given situation is to be sized properly so as to produce results equivalent to or better than those set forth specifically above.

Figure 9:
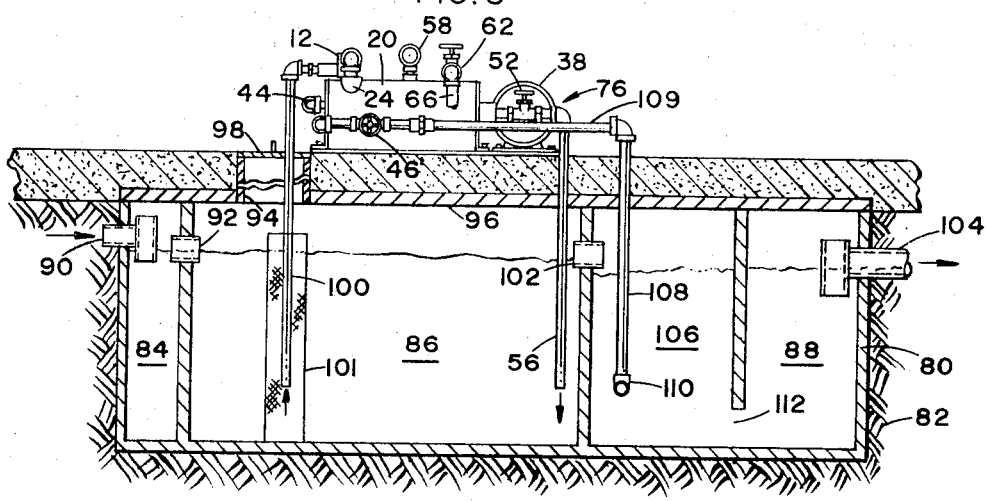
FIG. 9 is a view similar to FIG. 8 but showing an additional treatment tank associated with a septic tank to provide a two-stage system.

Under circumstances where an even higher degree of contaminant reduction or so-called "polishing" is required than that capable of being afforded by the arrangement shown in FIG. 8, attention is directed to FIG. 9 wherein the entire equipment shown in FIG. 8 is employed but, in addition, an auxiliary treatment compartment 106 is provided. Liquid which has been preliminarily treated in compartment 86 flows through port 102 into additional compartment 106 into which an additional conduit 108 extends. The upper end of said conduit communicates with conduit 44, for example, from compressor 38, by means of conduit 109, which connection may be made by any simple means. A flow control valve 46' also is included in conduit 109. The lower end of conduit 108 has a transverse head 110 thereon which is perforated to comprise a discharge tee of suitable length for purposes of additionally aerating the liquid in compartment 106 which has been treated to nearly fully desired extent prior to passage thereto. Under such circumstances, the capacity of compressor 38 may have to be slightly larger than that employed with respect to the embodiment shown in FIG. 8. In view of the relatively low pressures required by either of said systems with respect to compressed air however, the use of the additional compressed air in compartment 106 places no substantial burden upon the compressor 38.

After the supplemental or auxiliary aeration of the liquid in compartment 106, it passes through another discharge port 112 so as to enter exit compartment 88 from which it discharges through discharge head 104. The additional time within which the liquid lingers in exit compartment 88 permits the permeated air to act further upon the liquid and thereby insure the production of a very low B.O.D. or C.O.D. and also let the limited amount of suspended solids settle therefrom, before it discharges through the head 104 to a public stream or otherwise.

Figure 10:
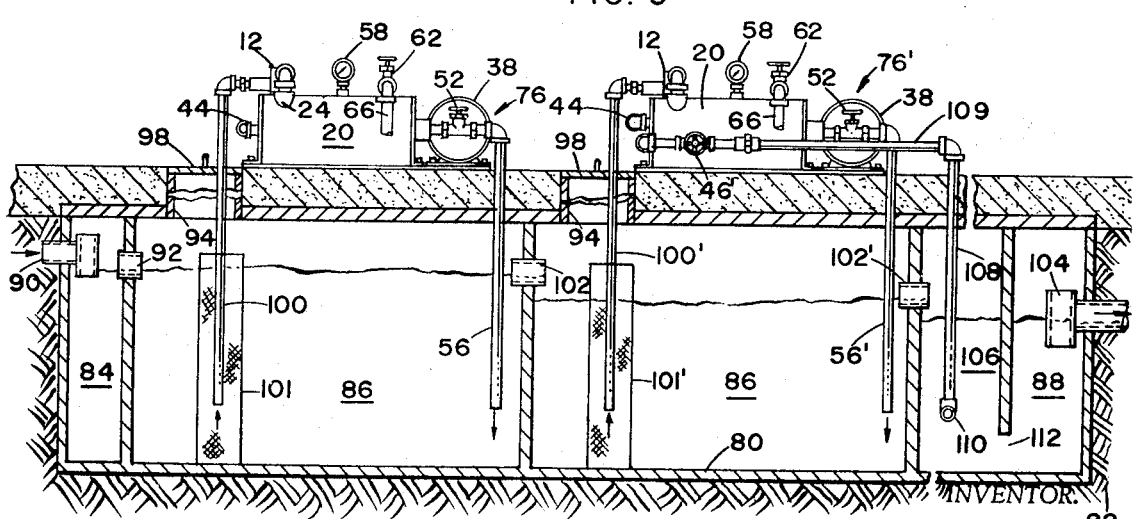
FIG. 10 is a view similar to FIG. 9 but showing a still further embodiment of a system for treating waste liquid which provides a three-stage system.

Under circumstances where greater capacity of liquid treatment is required, such as for example in relation to handling and treating domestic liquid discharge from a substantial group of dwelling units, including houses, house trailers and the like, attention is directed to FIG. 10 in which a further expansion of the arrangement shown in FIGS. 8 and 9 is illustrated. In the left-hand and central portions of FIG. 10, it will be seen that it corresponds to the arrangement shown in FIG. 9 except that between compartment 86 and further treatment or "polishing" compartment 106, another treating compartment 86' has been added which is serviced by a basic treatment system 76' similar to the system 76 which services compartment 86.

The operation of the arrangement of FIG. 10 is such that partially treated liquid which discharges from port 102 and compartment 86 flows into compartment 86' for further aeration by being drawn upwardly through uptake conduit 100', which is surrounded by screen 101'; whereupon it is processed through supplemental basic treatment system 76' and after which it is discharged through conduit 56' back into compartment 86'.

After a limited residual period in compartment 86', during which time the B.O.D. and C.O.D. is greatly reduced, it is discharged through port 102' into the exemplary "polishing" treatment compartment 106 where it is subjected to further aeration through the means of conduit 108 which discharges air through perforated tee 110 into the liquid before it passes through discharge port 112 into exit compartment 88 and, finally, through discharge head 104 into a public stream or the like.

From the foregoing, it will be seen that relatively simple but highly effective basic treatment systems, as well as entire treatment systems of variable capacity, are provided, all of which utilize similar basic principles of the present invention. The essential feature of the invention comprises the treating and mixing chamber 20, as well as the sparger 30 therein, and the functions performed thereby. Basically, the unit is a mixing unit for extensively permeating waste liquid with ambient oxygen, which usually is deficient in such liquid, in order to extensively reduce the B.O.D. content of the liquid.

In addition, the mixing unit also reduces the sizes of the solids in the waste liquid and thus permits ready action by the oxygen content of the air, whereby bacterial action may occur to a high degree of efficiency within the various treating compartments from which the waste liquid is pumped and into which the treated waste liquid, after aeration is returned. The basic treatment unit 76, when associated with a treatment tank in the ground, is mounted above the ground level so as to be safe from local flooding, as well as all components of the system readily being accessible for service, repair and the like. This is particularly advantageous in view of the electric motors which preferably are employed to operate the pump for the liquid and the compressor for the air. No critical control valves are required. The treatment tanks have been found to maintain a relatively uniform content of from 4 to 8 ppm of dissolved oxygen with no foam or floating contaminants exiting therein.

The basic treatment system also may be mounted upon and used to treat existing treatment tanks, as well as septic tanks, and maintain the same in clean, odorless condition. Unusually high surface contact between the air and waste material in the liquids is afforded. Further, the waste liquid discharged from the pump into the treating and mixing chamber enters the chamber in a manner to naturally induce swirling, without requiring complex structure, and thereby produce intimate mixing of the air with the liquid, the air being introduced into the chamber by a sparger, of which several design arrangements are disclosed above.

While the invention has been described and illustrated in its several preferred embodiments, it should be understood that the invention is not to be limited to the precise details herein illustrated and described since the same may be carried out in other ways falling within the scope of the invention as illustrated and described.

I claim:

1. A system for treating waste liquids to reduce the B.O.D. thereof comprising in combination, a tank having inlet means adjacent one end to receive contaminated liquid to be treated and an outlet adjacent the opposite end for discharging treated liquid; a mixing unit in combination with said tank comprising a closed chamber of limited capacity substantially less than said tank and having inlet and discharge means, a pump, an air compressor, conduit means connecting said pump to said tank to withdraw contaminated liquid therefrom and discharge it into said closed chamber at a predetermined rate, a perforated sparger extending longitudinally into said closed chamber through one end of said closed chamber, and additional conduit means extending from said compressor to the inlet means of said sparger to deliver compressed air thereto for discharge from said sparger into said closed chamber to aerate said contaminated liquid therein to a desired degree while increasing the pressure of said liquid within said chamber; and discharge conduit means connected to said discharge means on said closed chamber and directed into said tank to deliver highly aerated liquid thereto under pressure to effect aeration of said contaminated liquid in said tank at increased efficiency and thereby substantially effect and accelerate the reduction of B.O.D. thereof.

2. The system according to claim 1 in which said closed chamber is cylindrical at least at the inlet end thereof and said means to introduce liquid into said chamber being arranged tangentially with said cylindrical inlet end of said chamber.

3. The system according to claim 1 in which at least the portion of said closed chamber adjacent one end is cylindrical and said end of said chamber having said liquid inlet connected thereto, said liquid inlet extending tangentially to the axis of said cylindrical portion of said chamber and said sparger for said compressed air also being connected to the same end of said cylinder substantially coaxially with the axis thereof, whereby the liquid entering said chamber tangentially swirls around said sparger and thereby enhances the mixing of the liquid with said air delivered under pressure by said sparger into said liquid.

4. The system according to claim 1 in which said tank is a treatment tank adapted to be disposed below ground level, said mixing unit including supporting means adapted to be mounted above said treatment tank at a level no lower than ground level, whereby said mixing unit is readily available for servicing and observation of operation thereof, and said conduit means extending from said mixing unit to and from said treatment tank.

5. The system according to claim 4 further including an additional treatment tank adapted to be disposed below ground level adjacent the discharge end of said first mentioned treatment tank and connected to said discharge end thereof to receive pre-treated liquid from said tank, and additional air discharge means disposed within said additional treatment tank adjacent the bottom thereof, said additional air discharge means being connected to said air compressor to receive air under pressure therefrom and discharge the same into said additional treatment tank to further enchance the aeration of the treated liquid received from said first mentioned treatment tank and thereby further reduce the B.O.D. thereof, said additional treatment tank having a discharge outlet in one end for the discharge of such further treated liquid from the entire system.

6. The system according to claim 5 further including a still further treatment tank adapted to be disposed between said first mentioned treatment tank and said additional treatment tank, and an additional mixing unit connected by inlet and discharge conduits to said additional treatment tank, said still further treatment tank also having an inlet to receive pre-treated liquid discharged from said first mentioned treatment tank and said additional treatment tank being positioned and arranged to discharge additionally treated liquid into said additional treatment tank.

* * * * *